(12) United States Patent
Wada et al.

(10) Patent No.: US 8,650,274 B2
(45) Date of Patent: Feb. 11, 2014

(54) VIRTUAL INTEGRATED MANAGEMENT DEVICE FOR PERFORMING INFORMATION UPDATE PROCESS FOR DEVICE CONFIGURATION INFORMATION MANAGEMENT DEVICE

(75) Inventors: Yuji Wada, Kawasaki (JP); Masazumi Matsubara, Kawasaki (JP); Kenji Morimoto, Bunkyo (JP); Akira Katsuno, Kawasaki (JP); Yasuhide Matsumoto, Kawasaki (JP); Yukihiro Watanabe, Kawasaki (JP); Kuniaki Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 12/884,308

(22) Filed: Sep. 17, 2010

(65) Prior Publication Data

US 2011/0004675 A1 Jan. 6, 2011

Related U.S. Application Data

(63) Continuation of application No. PCT/JP2008/056399, filed on Mar. 31, 2008.

(51) Int. Cl.
G06F 15/173 (2006.01)

(52) U.S. Cl.
USPC .......................................... 709/223

(58) Field of Classification Search
USPC ......................................... 709/220, 223–224
See application file for complete search history.

(56) References Cited

U.S. PATENT DOCUMENTS

| | | | |
|---|---|---|---|
| 6,085,238 A * | 7/2000 | Yuasa et al. | 709/223 |
| 7,130,895 B2 * | 10/2006 | Zintel et al. | 709/220 |
| 7,146,357 B2 * | 12/2006 | Suzuki et al. | 707/688 |
| 7,194,538 B1 * | 3/2007 | Rabe et al. | 709/224 |
| 8,209,440 B2 * | 6/2012 | Wada et al. | 710/8 |
| 2004/0186829 A1 | 9/2004 | Suzuki et al. | |
| 2006/0004815 A1 * | 1/2006 | Murata et al. | 707/101 |
| 2007/0208832 A1 * | 9/2007 | Traub et al. | 709/220 |

FOREIGN PATENT DOCUMENTS

| | | |
|---|---|---|
| JP | 06-119227 | 4/1994 |
| JP | 10-307743 | 11/1998 |
| JP | 2004-280528 | 10/2004 |
| JP | 2006-18607 | 1/2006 |

OTHER PUBLICATIONS

Fujitsu, vol. 59, No. 1, 344th Issue, "Platforms for Unifying Data Center Information", IT Core Services, Jan. 10, 2008, pp. 1-14.

(Continued)

Primary Examiner — Lance L Barry
(74) Attorney, Agent, or Firm — Greer Burns & Crain, Ltd.

(57) ABSTRACT

An information management device for performing an information update process from a virtual integrated management device that manages a plurality of device configuration information management devices to the device configuration information management devices, comprises a meta information management unit and an update processing unit. The meta information management unit, which is used to store meta information, indicates from which device configuration information management devices managed information comes. The update processing unit is used to narrow down the device configuration information management devices having information. The information is the basis of information on an update process such as registration, update and deletion based on the meta information, and giving a request for the update process, such as registration, update and deletion only to the device configuration information management devices narrowed down.

9 Claims, 11 Drawing Sheets

(56) References Cited

OTHER PUBLICATIONS

Examination Report under Section 18(3) dated Mar. 7, 2012, in corresponding British Application No. GB1015946.5.
International Search Report issued in Int'l. App. No. PCT/JP2008/056399, mailed May 13, 2008.
Taniuchi et al.; "Data Center Togo Joho Kiban"; Fujitsu, 10; Jan. 2008; vol. 59, No. 1, pp. 45 to 49.
CMDB Federation (CMDBf), Committee Draft Ver.1.0; Oct. 22, 2007 http://cmdbf.org/schema/1-0-0/CMDBf%20v1.0.pdf.
Taniuchi, Y., et al., "Data Center Togo Joho Kiban", Fujitsu, 10; Jan. 2008; vol. 59, No. 1, pp. 45-49 (previously submitted on Sep. 17, 2010)—now being submitted with proper translation of [Figure 3] of D1. (One page).
Examination Report under Section 18(3) dated Oct. 8, 2012, in corresponding British Application No. GB1015946.5.

* cited by examiner

VIRTUAL INTEGRATED MANAGEMENT DEVICE FOR PERFORMING INFORMATION UPDATE PROCESS FOR DEVICE CONFIGURATION INFORMATION MANAGEMENT DEVICE

CROSS-REFERENCE TO RELATED APPLICATION

This application is a continuation application and is based upon PCT/JP2008/056399, filed on Mar. 31, 2008, the entire contents of which are incorporated herein by reference.

FIELD

The present invention relates to a virtual integrated management device (FCMDB: Federated Configuration Management Database) having a reconciliation function and a program therefor, wherein, when an information update process, such as for example, registration, update and deletion is performed in the FCMDB, the FCMDB efficiently requests an update for each device configuration information management device (MDR: Management Data Repository) under the management of the FCMDB.

BACKGROUND

FIG. 1 is a diagram illustrating a management architecture of MDRs by an FCMDB for describing a basic function of the FCMDB. FCMDB refers to a management system for virtually integrating databases DB of different types stored in a plurality of MDRs, and MDR refers to a storage device of the database to be managed. FCMDB 10 can transversely manipulate databases DB stored in the plurality of virtually integrated MDRs 11 to 16. While each MDR 11 to 16 manages information on resources (CI & Relationship), such as configuration information, incident information, trouble information, release information, alteration information or application information as well as relationship between information units, FCMDB 10 manages harmonized information. FCMDB 10 receives a search request via an external computer or its own input device and, in response to the request, derives search results from the plurality of the MDRs 11 to 16. In the following figures, the term "application" is abbreviated to "APP".

FIG. 2 is a diagram illustrating a management architecture of MDRs by an FCMDB for describing a reconciliation function of the FCMDB. FCMDB 20 in FIG. 2 has a function identical to that of FCMDB 10 in FIG. 1. FCMDB 20 can transversely manipulate databases DB stored in a plurality of virtually integrated MDRs 21 to 26 and FCMDB 20 has an information reconciliation function. The information reconciliation function of FCMDB 20 performs the following two tasks: 1) Integrate information on requests (hereinafter referred to as "items") 21A to 24A for an identical update process that are managed under different names (server, host, node) in each database DB. Specifically, unify the names into the "server"; and 2) Integrate information on identical items 21A to 24A managed under different local IDs (Webmaster1, 192.168.10.1, hostnameX) in each database DB. Specifically, unify the IDs into a "Serial Number-XXX".

Patent Document 1 discloses a technique in which, in order to reduce update time for a distributed database, an update process is performed only in a main database having one main copy and, at the time of synchronization, an update history is sent to secondary databases each having different copies other than the main copy to update the secondary copies to allow them to have the same contents as the main copy according to the update history. But, in the invention set forth in Patent Document 1, though the update history is sent to the MDRs (databases) having the information related to that to be updated at the time of synchronization to allow the MDRs to update the information, the update request itself for registration, update and deletion is not sent.

Patent Document 1: Japanese Laid-open Patent Publication No. H06-119227

Non Patent Document 2: http://cmdbf.org/schema/1-0-0/CMDBf%20v1.0.pdf

DISCLOSURE OF THE INVENTION

Problems to be Solved by the Invention

FIG. 3 is a diagram illustrating a management architecture of MDRs by an FCMDB for describing a problem of the prior art. Conventional FCMDB 30 provides only a search function but does not provide the registration, update and deletion functions. Assuming that a request for an update process such as registration, update and deletion is given via FCMDB 20 to all MDRs 31 to 33 that are virtually integrated by FCMDB 30 without directly accessing individual MDRs 31 to 33, the processing request is given also to MDR 32 to which the processing request is not necessary to be given in itself. In other words, when there is an MDR that does not have to receive the processing request and perform the processing, it cannot be determined to which MDRs 31 to 33 the processing request should be given. As a result, there is a problem in that an unnecessary processing request is inefficiently given to MDR 32.

FIG. 4 is a diagram illustrating a management architecture of MDRs by an FCMDB that solves the problem of the prior art. In order to solve the above problem of the prior art, when existing FCMDB 40 receives a request for an update process such as registration, update and deletion, the unnecessary processing request should not be given to MDR 42 that does not have to perform the processing in itself, or when there is no MDR that should receive the processing request, the processing request should not be given at all.

SUMMARY

An information management device of a first embodiment stores meta information indicating where managed information comes from and, based on the meta information, narrows down MDRs having information which is the basis of information on an update process such as registration, update and deletion, and gives a request for the update process such as registration, update and deletion only to the MDRs narrowed down.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

EFFECT OF THE INVENTION

According to the first and second embodiments, a source of managed information used for reconciliation is stored so that the MDRs to which the update process is requested can be minimized, which cannot be implemented in the prior art.

DESCRIPTION OF EMBODIMENTS

Figure 1:
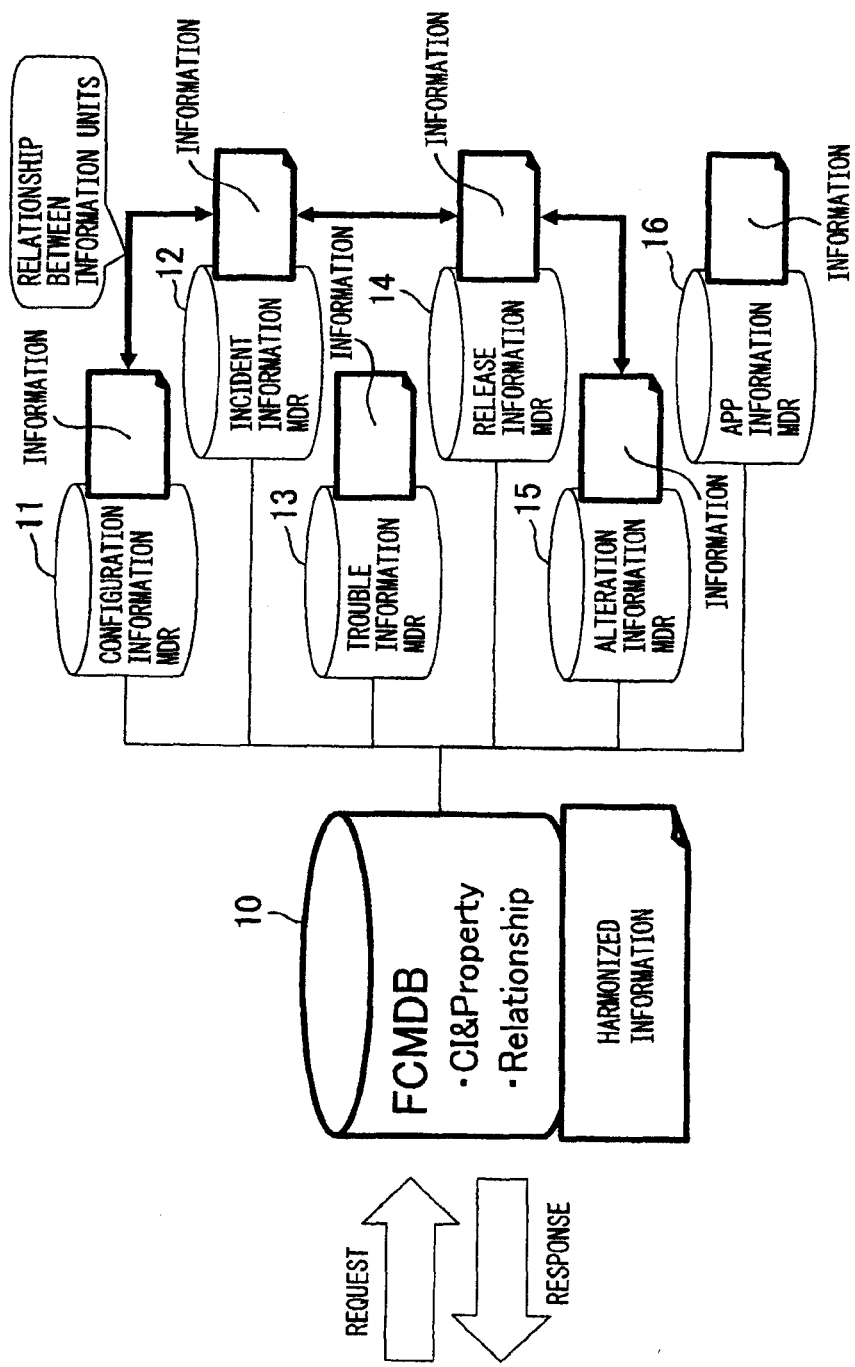
FIG. 1 is a diagram illustrating a management architecture of MDRs by an FCMDB for describing a basic function of the FCMDB (prior art)
Figure 2:
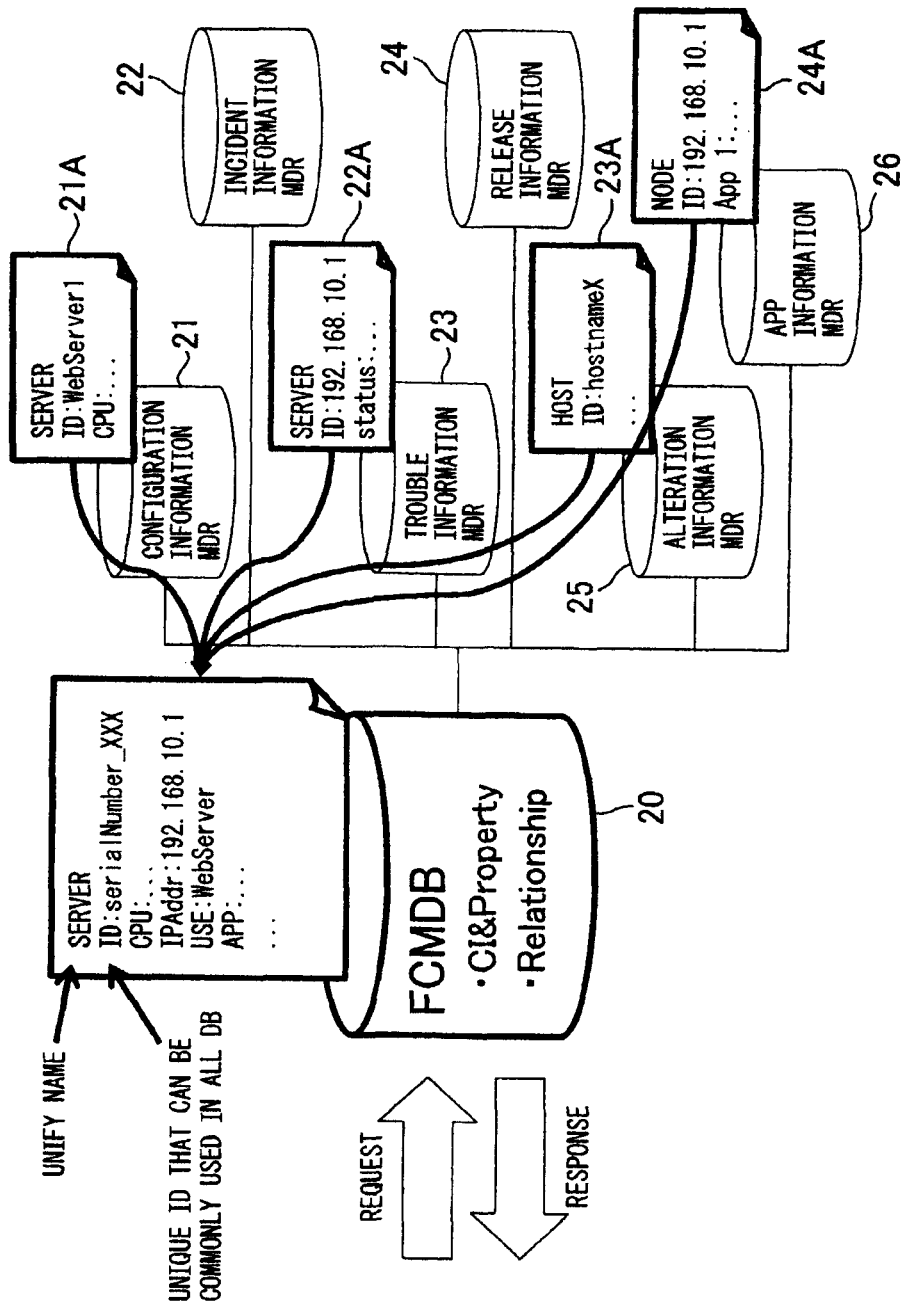
FIG. 2 is a diagram illustrating a management architecture of MDRs by an FCMDB for describing a reconciliation function of the FCMDB (prior art)
Figure 3:
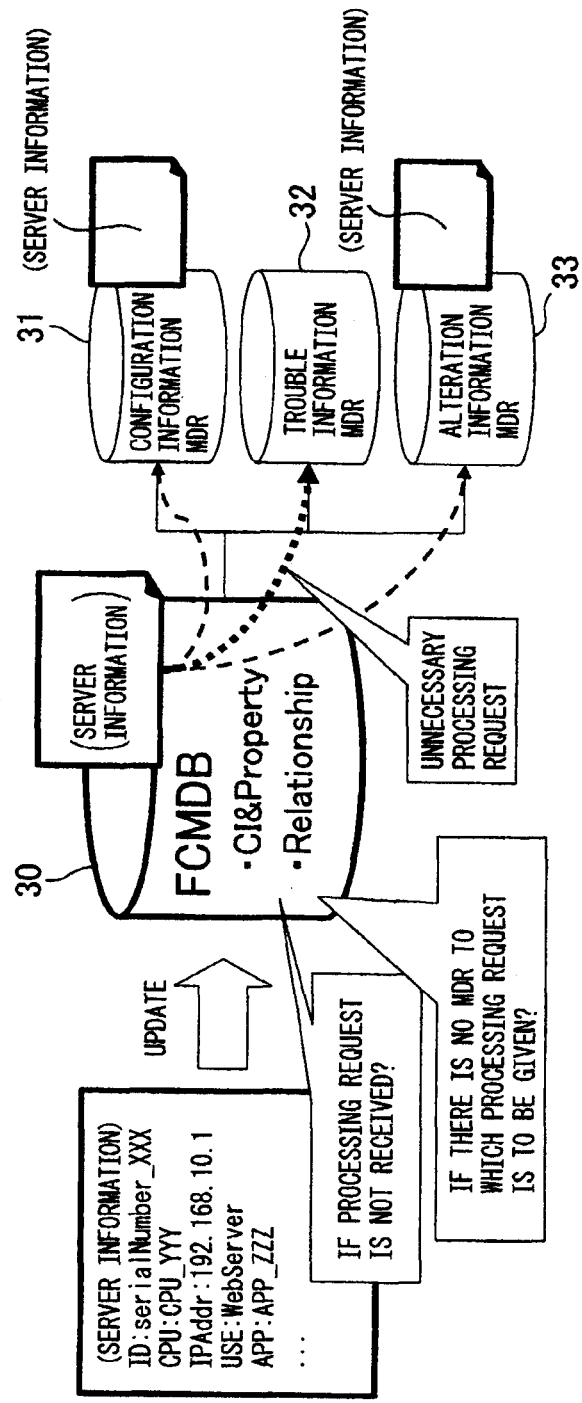
FIG. 3 is a diagram illustrating a management architecture of MDRs by an FCMDB for describing a problem of the prior art (prior art)
Figure 4:
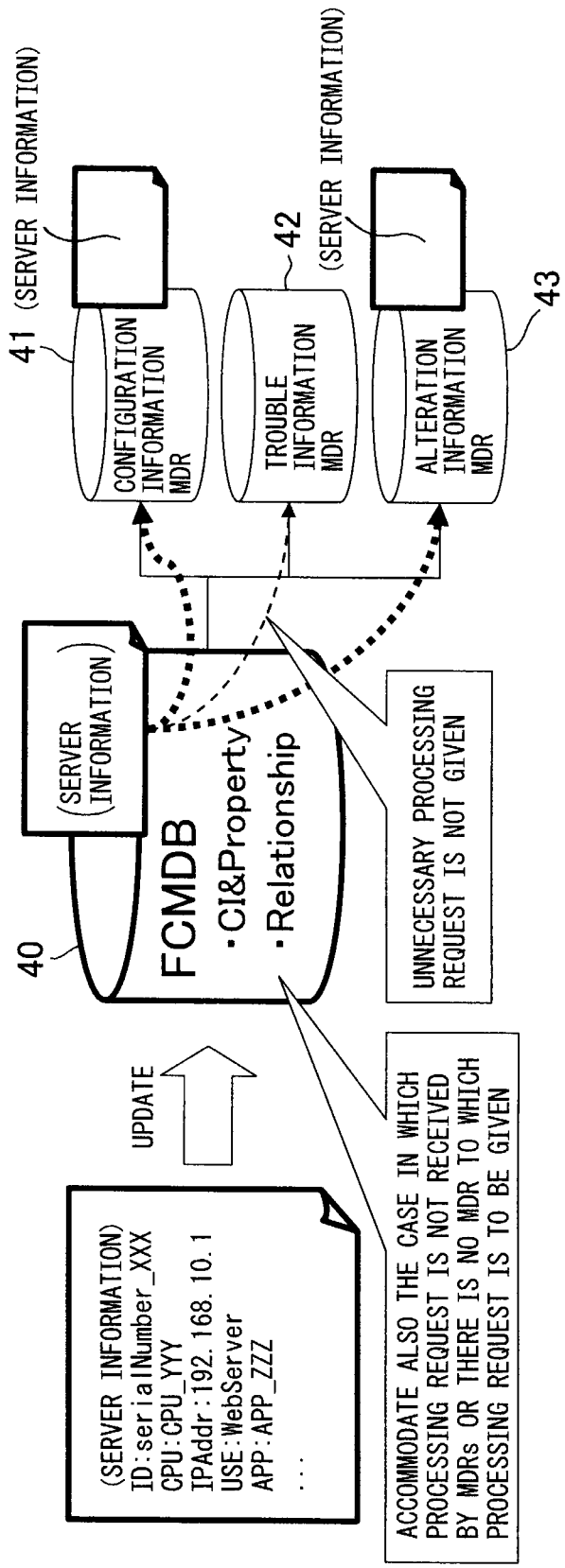
FIG. 4 is a diagram illustrating a management architecture of MDRs by an FCMDB that solves the problem of the prior art.
Figure 5:
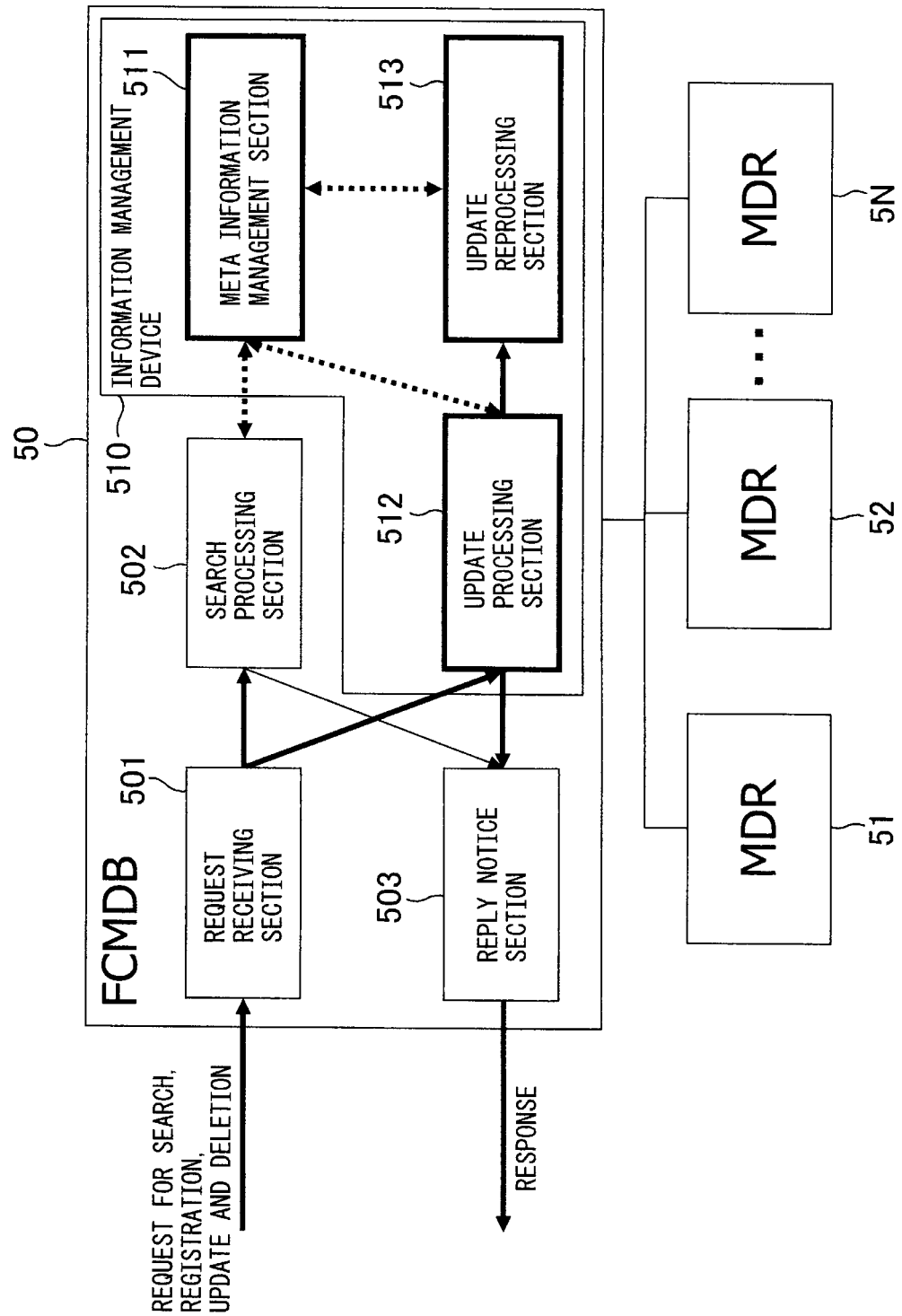
FIG. 5 is a block diagram of an information management device according to an embodiment in a management architecture of MDRs by an FCMDB.

FIG. 5 is a block diagram of an information management device according to an embodiment in a management architecture of MDRs by an FCMDB. Information management device 510 according to this embodiment illustrated in FIG. 5 is incorporated into FCMDB 50. However, in other embodiments, information management device 510 may be communicatably connected to FCMDB 50 and disposed outside FCMDB 50. Similar to FCMDB 50, information management device 510 of this embodiment is a computer device comprising at least a CPU, a main storage (memory) and an auxiliary storage (magnetic disk) that are not illustrated in the figure. The information described below is stored in the auxiliary storage and the process is performed by a program written in the main storage.

As illustrated in FIG. 5, FCMDB 50 has a meta information management section 511, an update processing section 512 and an update reprocessing section 513 that are provided in information management device 510, in addition to a request receiving section 501, a search processing section 502 and a reply notice section 503 that are provided in the prior art.

Request receiving section 501 receives a request for search, registration, update and deletion. Search processing section 502 receives a search request from request receiving section 501, sends such request to MDR 51, MDR 52, ..., MDR 5N, receives a search result, and sends the received search result to reply notice section 503. If a search target is found, search processing section 502 sends a notification of the search target as a search result to reply notice section 503. If not, search processing section 502 sends a notification that the search target is not found as a search result to reply notice section 503. In response, reply notice section 503 notifies of the processing result to the request for search, registration, update and deletion to the requesting source.

Meta information management section 511 manages meta information. The meta information includes the following three information units. (1) CI/Relationship meta information: it includes source information indicating from which MDRs managed information comes and that includes CI information and Relationship information, wherein the CI (Configuration Item) information indicates items that are requests for managed update processes. The Relationship information indicates a relationship between the items and indicates which MDR's DB stores each item.

(2) Property meta information: it is information on attributes of the items that includes Property names of the items and source information indicating from which MDR each item comes. The Property names indicate the attributes of the items such as hardware or software. The source information indicates which MDR's DB stores the attribute information corresponding to each Property name.

(3) Unprocessed information: it is information indicating that the request for the update process is not completed and it includes a request ID, CI/Relationship ID, type, Property and Value. The request ID is information for identifying the uncompleted request for the update process such as, for example, the request's name. The CI/Relationship ID is information for identifying the CI/Relationship information. The type is information indicating which of the registration, update and deletion is requested. The Property is information indicating the attributes of the items such as hardware or software associated with the uncompleted update request. The Value is data of the Property.

Update processing section 512 consults the information possessed by meta information management section 511 and performs the update process such as registration, update and deletion. Update reprocessing section 513 repeatedly and regularly performs the update process that has not been performed in update processing section 512 for a new MDR or the MDR that has not received the process request, consulting the information possessed by meta information management section 511. If the process is performed repeatedly, it does not have to be performed regularly. In the following description, information management device 510 that is included in FCMDB 50 is referred to as FCMDB 50.

Figure 6:
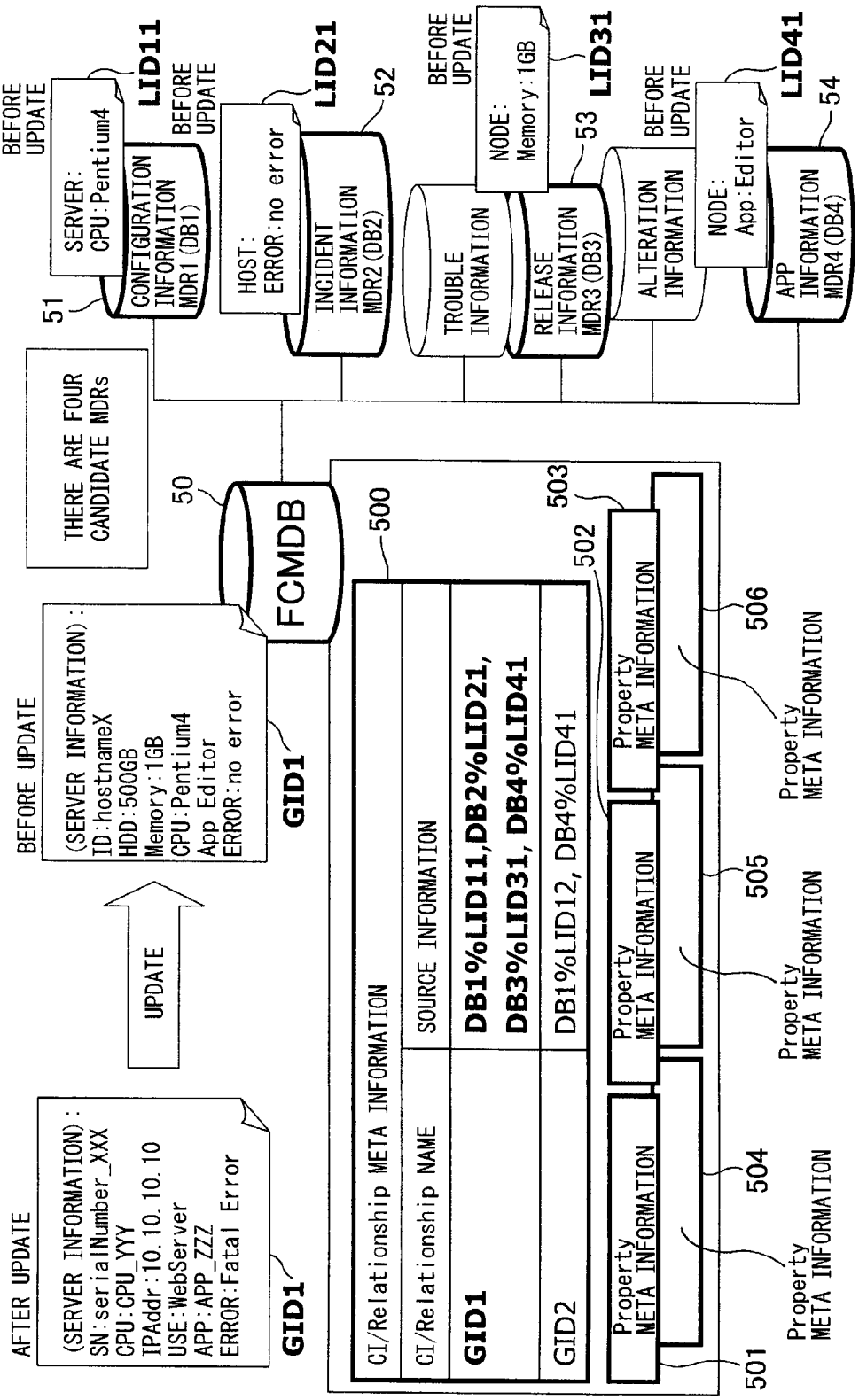
FIG. 6 is a diagram illustrating a first embodiment of an information management device in a management architecture of MDRs by an FCMDB.

FIG. 6 is a diagram illustrating a first embodiment of an information management device in a management architecture of MDRs by an FCMDB. FCMDB 50 narrows down the MDRs by using the CI and Relationship meta information.

In the first embodiment illustrated in FIG. 6, FCMDB 50 stores a table 500 for the CI/Relationship meta information and tables 501-506 for the Property meta information. The CI/Relationship meta information manages correspondence of the CI/Relationship identifiers already registered in FCMDB to the source information. Table 500 registers information on items GID1 and GID2 that are the CI/Relationship identifiers. In table 500, a source information field corresponding to item GID1 indicates that the information on the item GID1 resides in LID11 in DB1, LID21 in DB2, LID 31 in DB3 and LID41 in DB4. This is similar to the item GID2 and its description is therefore omitted. Here, LID11, LID21, LID31 and LID41 are where the information to which the update process is performed resides.

Item GID1 is the information whose update is requested. From the comparison between before and after the update of item GID1, it can be seen from table 500 that related information units on Memory, CPU, APP (Application) and ERROR reside in LID11, LID21, LID31 and LID41. Since LID11, LID21, LID31 and LID41 are stored in MDR 51 in DB1, MDR 52 in DB2, MDR 53 in DB3 and MDR 54 in DB4, respectively, FCMDB 50 gives an update request only to these four candidate MDRs 51 to 54.

The information units on CPU, Memory, ERROR and App are updated in LID11 in DB1, LID21 in DB2, LID31 in DB3 and LID41 in DB4, respectively.

Figure 7:
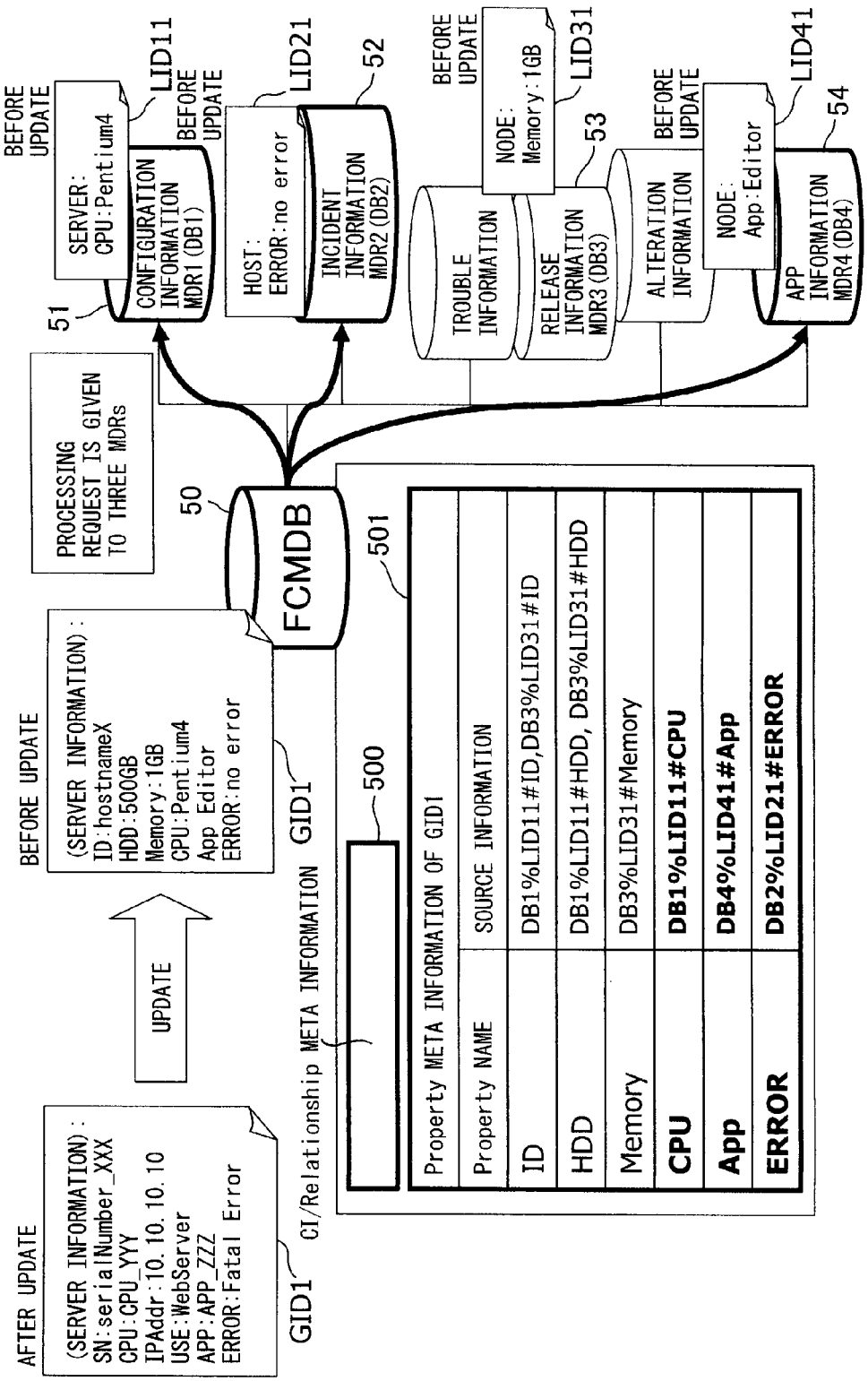
FIG. 7 is a diagram illustrating a second embodiment of an information management device in a management architecture of MDRs by an FCMDB.

FIG. 7 is a diagram illustrating a second embodiment of an information management device in a management architecture of MDRs by an FCMDB. In FCMDB 50, meta information management section 511 manages the Property meta information. Update processing section 512 narrows down the MDRs by using the Property meta information.

In the second embodiment illustrated in FIG. 7, in table 501 for the Property meta information, the Property name column of an item indicates ID, HDD, Memory, CPU, App and ERROR. The source information column indicates which MDRs' DBs store related information units on the Property name ID, HDD, Memory, CPU, App and ERROR, respectively. For example, it indicates that the information unit on ID is stored in LID11 in MDR (DB) 1 and LID 31 in MDR (DB) 3.

Item GID1 is the information whose update is requested. From the comparison between before and after the update of item GID1, it can be seen from table 501 that CPU, App and ERROR are updated in the Property name column of item GID1. Consequently, FCMDB 50 gives an update request only to three candidates MDR (DB) 1, MDR (DB) 2 and MDR (DB) 4 narrowed down from the source information units corresponding to CPU, App and ERROR.

Figure 8:
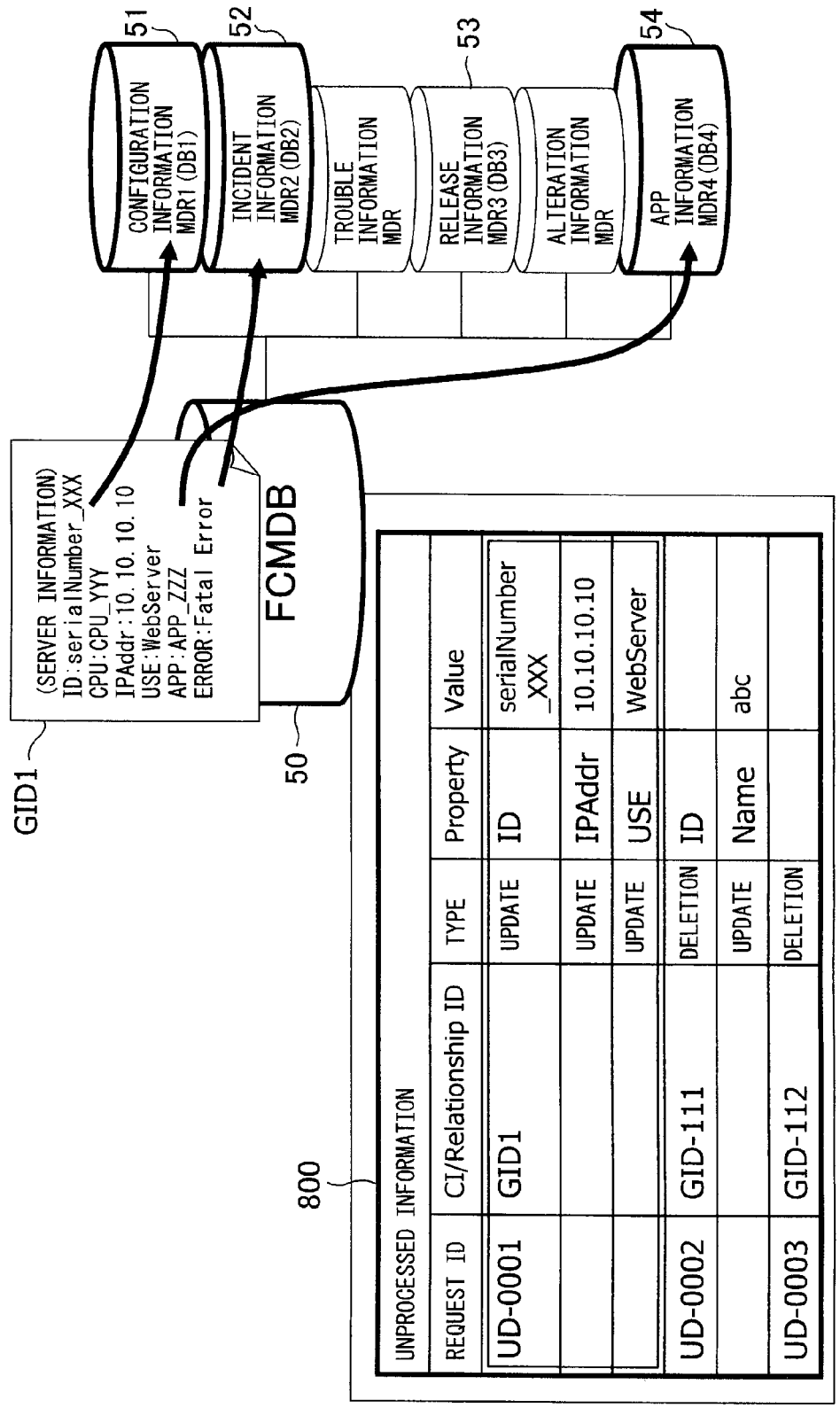
FIG. 8 is a diagram illustrating a third embodiment of an information management device in a management architecture of MDRs by an FCMDB.

FIG. 8 is a diagram illustrating a third embodiment of an information management device in a management architecture of MDRs by an FCMDB.

In the third embodiment illustrated in FIG. 8, meta information management section 511 gives a request for the registration, update and deletion and manages the unprocessed part for which no MDR has received the request for the registration, update and deletion. The information on the unprocessed part for the request for the registration, update and deletion (hereinafter referred to as the unprocessed information) is stored in a table 800.

Table 800 for storing the unprocessed information has columns of Request ID, CI/Relationship ID, Type, Property and Value. The Request ID column stores names of the unprocessed information units UD-0001, UD-0012, UD-0013. The CI/Relationship column stores items GID1, GID-111, GID-112 corresponding to the names of the unprocessed information units. The Type column stores registration, update and deletion. The Property column stores Property name ID, IPAddr, USE, Name as illustrated in the figure. The Value column stores Property (attribute) values corresponding to the Property names. For example, the Value column stores an attribute value SerialNumber-XXX corresponding to the Property name SN.

FCMDB 50 stores item GID1 having the unprocessed information CPU, APP, ERROR in the update of item GID1 along with Request ID, Type, Property, Value in table 800.

Figure 9:
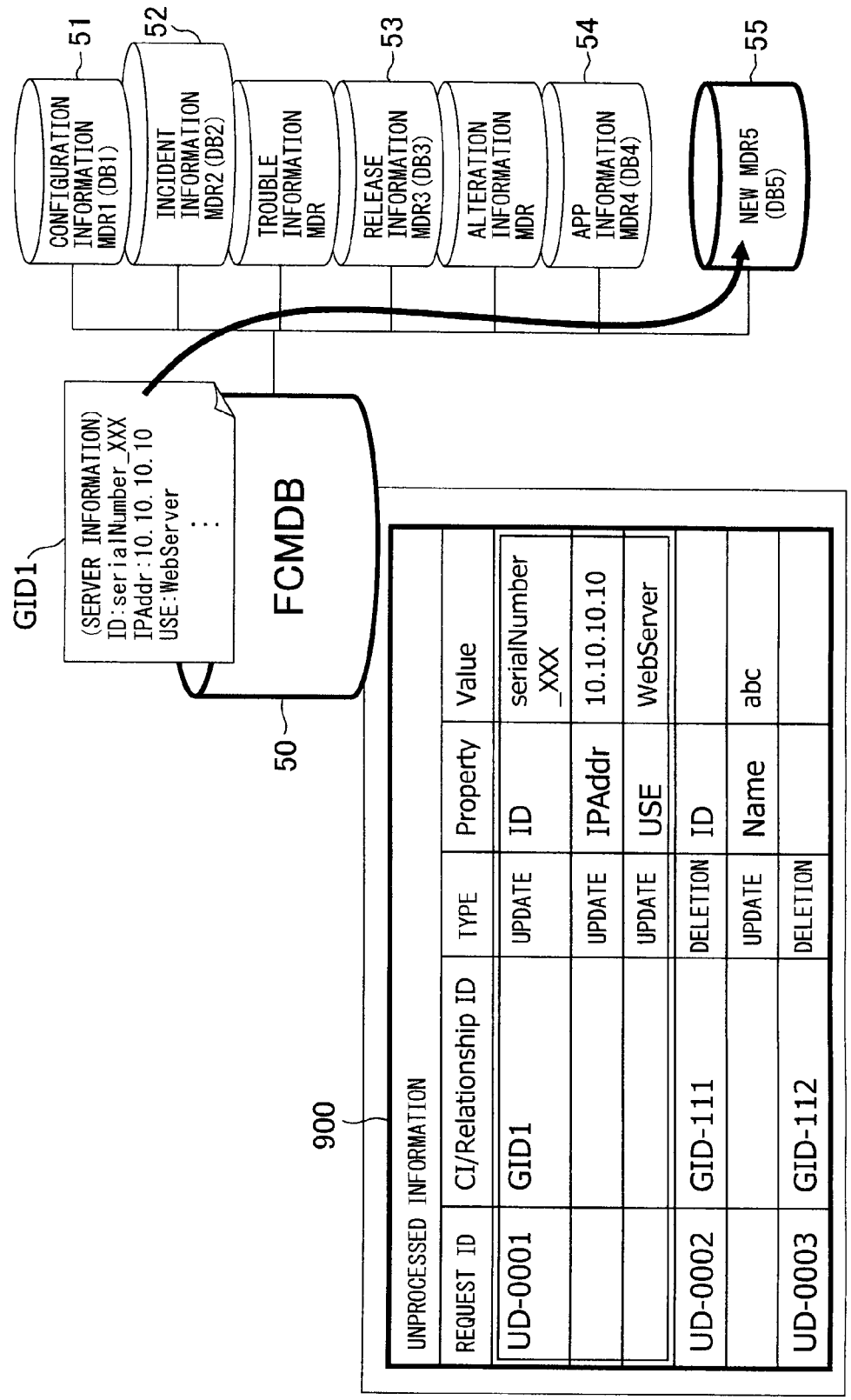
FIG. 9 is a diagram illustrating a fourth embodiment of an information management device in a management architecture of MDRs by an FCMDB.

FIG. 9 is a diagram illustrating a fourth embodiment of an information management device in a management architecture of MDRs by an FCMDB.

In the fourth embodiment illustrated in FIG. 9, when a new MDR 5 is registered in FCMDB, update reprocessing section 513 consults meta information management section 511 and gives a request for unprocessed registration, update and deletion with respect to MDR 5 stored in a table 900 by update processing section 512. Further, when the unprocessed request for the registration, update and deletion is resolved or, in other words, when the request is received, update reprocessing section 513 deletes the request in question from table 900. In the example illustrated in FIG. 9, with respect to the request having a request ID UD-0001, a request for the unprocessed update is given. After the update request for GID1 is received, the related information on UD-0001 is deleted from table 900.

Figure 10:
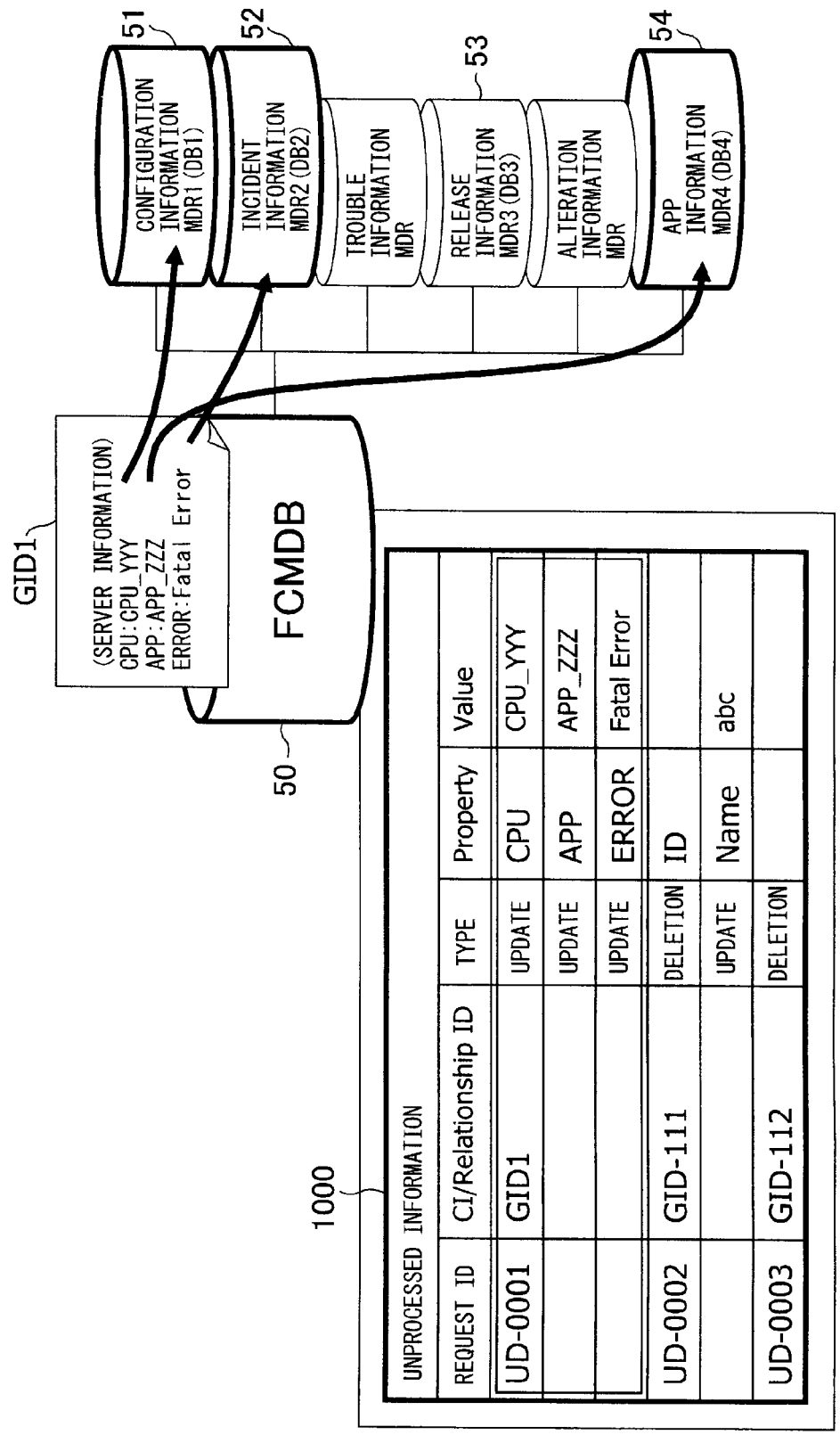
FIG. 10 is a diagram illustrating a fifth embodiment of an information management device in a management architecture of MDRs by an FCMDB.

FIG. 10 is a diagram illustrating a fifth embodiment of an information management device in a management architecture of MDRs by an FCMDB.

In the fifth embodiment illustrated in FIG. 10, update reprocessing section 513 consults meta information management section 511 and regularly gives a request for the registration, update and deletion to the MDRs having related information to manage the unprocessed part for which no MDR has received the request for the registration, update and deletion. Update processing section 512 repeatedly and regularly gives a request for the registration, update and deletion to the MDRs having the related information. If the process is performed repeatedly, it does not have to be performed regularly. Further, update reprocessing section 513 deletes the request for the registration, update and deletion having no unprocessed part from a table 1000.

In the example illustrated in FIG. 10, for a request having a request ID UD-0001, a request for uncompleted update is given repeatedly and, after the update request to GID1 is received, related information of UD-0001 is deleted from table 1000.

Figure 11:
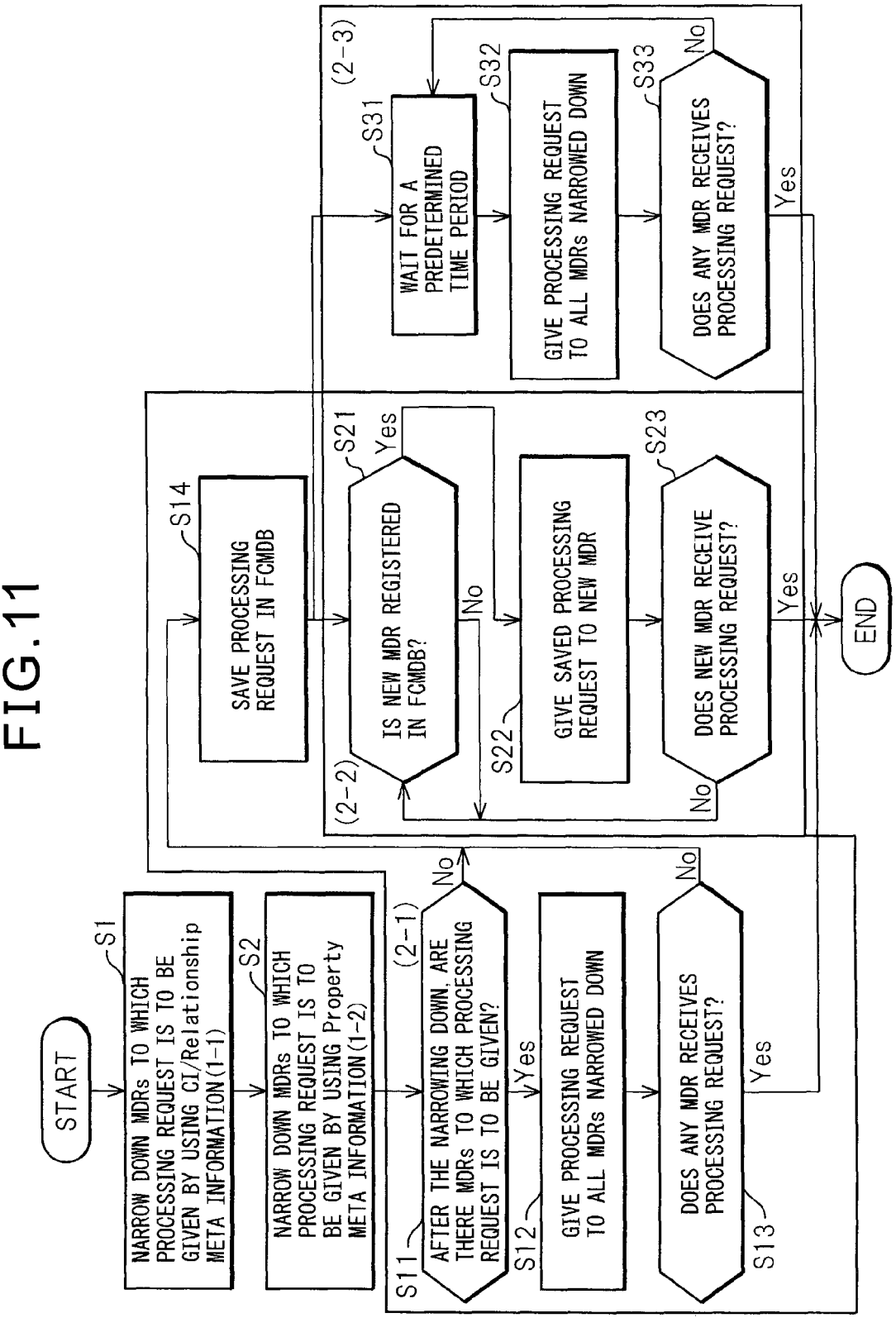
FIG. 11 is a flowchart of a process by an information management device according to embodiments.

FIG. 11 is a flowchart of a process by the information management device according to the embodiments. Hereinafter, the processes by the information management device according to the first to fifth embodiments as set forth above will be described. In the first embodiment, in step S1, the MDRs to which the processing request is to be given are narrowed down by using the CI/Relationship meta information.

In the second embodiment, in step S2, the MDRs to which the processing request is given are narrowed down by using the Property meta information.

In the third embodiment, the following process is performed. After the narrowing down in step S11, it is determined whether there are the MDRs to which the processing request is to be given or not. If YES, the process proceeds to step S12 and, if NO, the process proceeds to step S14. The processing request is given to all the MDRs narrowed down in step S12 and, then, the process proceeds to step S13. In step S13, it is checked whether the processing request is received by any MDR or not. If YES, the process terminates and, if NO, the process proceeds to step S14. In step S14, the processing request is saved in the FCMDB.

In the fourth embodiment, the following process is performed. In step S21, it is checked whether a new MDR is registered in the FCMDB or not. If YES, the process proceeds to step S22 and, if NO, the process proceeds to step S23. In step S22, the saved processing request is given to the newly registered MDR. In step S23, it is checked whether the new MDR receives the processing request or not. If YES, the process terminates and, if NO, the process returns to step S21. In the case of YES in step S23, the process terminates after deleting the saved processing request.

In the fifth embodiment, the following process is performed. In step S31, the process waits for a predetermined time period and, after the predetermined time period elapses, the process proceeds to step S32. In step S32, the processing request is given to all the MDRs narrowed down. In step S33, it is checked whether the processing request is received by any MDR or not. If YES, the process terminates and, if NO, the process returns to step S31. In the case of YES in step S33, the process terminates after deleting the saved processing request.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer readable non-transitory medium storing a program for a virtual integrated management device for performing an information update process from the virtual integrated management device that manages a plurality of device configuration information management devices to the device configuration information management devices, the program causing a computer to execute:
   storing meta information that indicates in which device configuration information management devices information used for reconciliation exists;
   narrowing down the device configuration information management devices having information which is the basis of information on the update process including registration, update and deletion based on the meta information;
   giving a request for the update process including registration, update and deletion only to the device configuration information management devices narrowed down;
   giving a request for the information update process temporarily saved to a first device configuration information management device when the first device configuration information management device is newly registered in the virtual integrated management device; and
   completing the temporarily saved processing request if the first device configuration information management device receives the request.

2. The computer readable medium according to claim 1, wherein the program causes the computer to execute:
   after the narrowing down,
   when it is determined that there are the device configuration information management devices to which the processing request is to be given, giving the processing request to all the device configuration information management devices narrowed down; and
   when it is determined that there is no device configuration information management device to which the processing request is to be given and that any of the device configuration information management devices does not receive the processing request, saving the processing request in the virtual integrated management device.

3. The computer readable medium according to claim 2, wherein the program causes the computer to execute:
   determining whether a new device configuration information management device is registered in the virtual integrated management device or not; and
   giving the processing request saved in the virtual integrated management device to the newly registered device configuration information management device.

4. The computer readable medium according to claim 2, wherein the program causes the computer to execute:
   waiting for a predetermined time period and, after the predetermined time period elapses, giving the processing request saved in the virtual integrated management device to all the device configuration information management devices narrowed down.

5. A computer readable non-transitory medium storing a program for a virtual integrated management device for performing an information update process from the virtual integrated management device that manages a plurality of device configuration information management devices to the device configuration information management devices, the program causing a computer to execute:
   storing attribute information on an identifier that is a request of the update process;
   narrowing down the device configuration information management devices having the information which is the basis of the information on the update process including registration, update and deletion based on the attribute information;
   giving the request for the update process including registration, update and deletion only to the device configuration information management devices narrowed down;
   giving a request for the information update process temporarily saved to a first device configuration information management device when the first device configuration information management device is newly registered in the virtual integrated management device; and
   completing the temporarily saved processing request if the first device configuration information management device receives the request.

6. The computer readable medium according to claim 5, wherein the program causes the computer to execute:
   after the narrowing down,
   when it is determined that there are the device configuration information management devices to which the processing request is to be given, giving the processing request to all the device configuration information management devices narrowed down; and
   when it is determined that there is no device configuration information management device to which the processing request is to be given and that any of the device configuration information management devices does not receive the processing request, saving the processing request in the virtual integrated management device.

7. The computer readable medium according to claim 6, wherein the program causes the computer to execute:
   determining whether a new device configuration information management device is registered in the virtual integrated management device or not; and
   giving the processing request saved in the virtual integrated management device to the newly registered device configuration information management device.

8. The computer readable medium according to claim 6, wherein the program causes the computer to execute:
   waiting for a predetermined time period and, after the predetermined time period elapses, giving the processing request saved in the virtual integrated management device to all the device configuration information management devices narrowed down.

9. An information management device for performing an information update process from a virtual integrated management device that manages a plurality of device configuration information management devices to the device configuration information management devices, comprising:

a memory that stores meta information that indicates from which device configuration information management devices managed information comes; and a processor that narrows down the device configuration information management devices having information which is the basis of information on an update process including registration, update and deletion based on the meta information, and that gives a request for the update process including registration, update and deletion only to the device configuration information management devices narrowed down; and wherein the processor gives a request for the information update process temporarily saved by the memory to a first device configuration information management device when the first device configuration information management device is newly registered in the virtual integrated management device, and that completes the temporarily saved processing request if the first device configuration information management device receives the request.

* * * * *